(12) United States Patent
Suzuki

(10) Patent No.: US 11,468,251 B2
(45) Date of Patent: Oct. 11, 2022

(54) TAG READER

(71) Applicant: TOSHIBA TEC KABUSHIKI KAISHA, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/122,707

(22) Filed: Dec. 15, 2020

(65) Prior Publication Data

US 2021/0264120 A1 Aug. 26, 2021

(30) Foreign Application Priority Data

Feb. 25, 2020 (JP) .............................. JP2020-029096

(51) Int. Cl.
| | | |
|---|---|---|
| *G06K 7/10* | (2006.01) | |
| *G01K 7/22* | (2006.01) | |
| *G06K 19/07* | (2006.01) | |
| *G06Q 10/08* | (2012.01) | |
| *H01C 7/00* | (2006.01) | |

(52) U.S. Cl.
CPC ........... *G06K 7/10297* (2013.01); *G01K 7/22* (2013.01); *G06K 7/10108* (2013.01); *G06K 7/10316* (2013.01); *G06K 7/10386* (2013.01); *G06K 7/10405* (2013.01); *G06K 19/0717* (2013.01); *G06K 19/0723* (2013.01); *G06K 2007/10524* (2013.01); *G06Q 10/087* (2013.01); *H01C 7/008* (2013.01)

(58) Field of Classification Search
CPC ........... G06K 7/10297; G06K 7/10108; G06K 7/10316; G06K 7/10386; G06K 7/10405; G06K 19/0717; G06K 19/0723; G06K 2007/10524; G06K 7/10118; G06K 7/10217; G06K 7/10; G01K 7/22; G01K 3/005; G06Q 10/087; H01C 7/008
See application file for complete search history.

(56) References Cited

U.S. PATENT DOCUMENTS

| | | |
|---|---|---|
| 7,782,586 B2 | 8/2010 | Soleimani et al. |
| 8,199,015 B2 | 6/2012 | Sandler et al. |
| 2006/0267733 A1* | 11/2006 | Steinke ................ G06K 7/0004 340/10.1 |

FOREIGN PATENT DOCUMENTS

| | | |
|---|---|---|
| CN | 104460813 B | 3/2016 |
| WO | 2009026059 A1 | 2/2009 |
| WO | 2010141212 A1 | 12/2010 |
| WO | 2015115468 A1 | 8/2015 |

OTHER PUBLICATIONS

Extended European Search Report dated Oct. 14, 2021, mailed in counterpart European Application No. 21155457.1, 8 pages.

\* cited by examiner

*Primary Examiner* — Seung H Lee
(74) *Attorney, Agent, or Firm* — Kim & Stewart LLP

(57) ABSTRACT

According to one or more embodiments, the tag reader includes a communication controller, a temperature measuring sensor, and a processor. The communication controller controls an output signal to be output from an antenna of the tag reader. The temperature measuring sensor measures an internal temperature of the tag reader. The processor sets the output value of an output signal based on the measured temperature and causes the communication control circuit to output the output signal from the antenna at the set output value.

20 Claims, 5 Drawing Sheets

FIG. 4

Data memory 29

1st operation mode (th11 < th12 < th13) — 51

| Temperature a | Output value P | Downtime D |
|---|---|---|
| $a \leq th11$ | $P = p10$ | $D = d10$ |
| $th11 < a \leq th12$ | $P = p10 - p11$ | $D = d10 + d11$ |
| $th12 < a \leq th13$ | $P = p10 - p11 - p12$ | $D = d10 + d11 + d12$ |
| $th13 < a$ | Error | Error |

2nd operation mode (th21 < th22 < th23) — 52

| Temperature a | Output value P | Downtime D |
|---|---|---|
| $a \leq th21$ | $P = p20$ | $D = d20$ |
| $th21 < a \leq th22$ | $P = p20 - p21$ | $D = d20 + d21$ |
| $th22 < a \leq th23$ | $P = p20 - p21 - p22$ | $D = d20 + d21 + d22$ |
| $th23 < a$ | Error | Error |

TAG READER

CROSS-REFERENCE TO RELATED APPLICATIONS

This application is based upon and claims the benefit of priority from Japanese Patent Application No. 2020-029096, filed on Feb. 25, 2020, the entire contents of which are incorporated herein by reference.

FIELD

Embodiments described herein relate generally to a tag reader.

BACKGROUND

When a tag reader continuously performs a process of reading a Radio-Frequency Identification (RFID) tag (herein may also be referred to as a wireless tag), the temperature of the tag reader tends to increase. If the temperature of the tag reader exceeds a design limit temperature of a component thereof, the tag reader may fail. In order to prevent a failure due to a temperature rise, some conventional tag readers stop operations to prevent a further temperature increase once a predetermined limit temperature is reached.

However, when the tag reader suddenly stops due to a temperature rise during the continuous reading of RFID tags, a reading rate can be substantially reduced. For example, some tag reading systems search for an RFID tag (identifying an article, an item, or the like) by using the results nearly continuous readings of the RFID tag or tags while the tag reader is moved around. In such a tag reading system, the desired processing result intended by an operator may not be obtained if the tag reader suddenly stops due to an unintended temperature rise.

BRIEF DESCRIPTION OF THE DRAWINGS

FIG. 4 depicts an example settings table stored in a tag reader according to an embodiment.

DETAILED DESCRIPTION

In general, according to one embodiment, a tag reader includes a communication controller configured to control output signals to be output from an antenna in a tag reading operation. These output signals can be a tag interrogation signal for requesting or reading information from a wireless tag (e.g., an RFID tag or the like). The tag reader includes a temperature measuring sensor configured to measure an internal temperature of the tag reader. A processor of the tag reader is configured to set an output value for an output signal based on the measured internal temperature, and cause the communication control circuit to output the output signal from the antenna at the set output value.

Hereinafter, certain example embodiments will be described in further detail with reference to the accompanying drawings.

Figure 1:
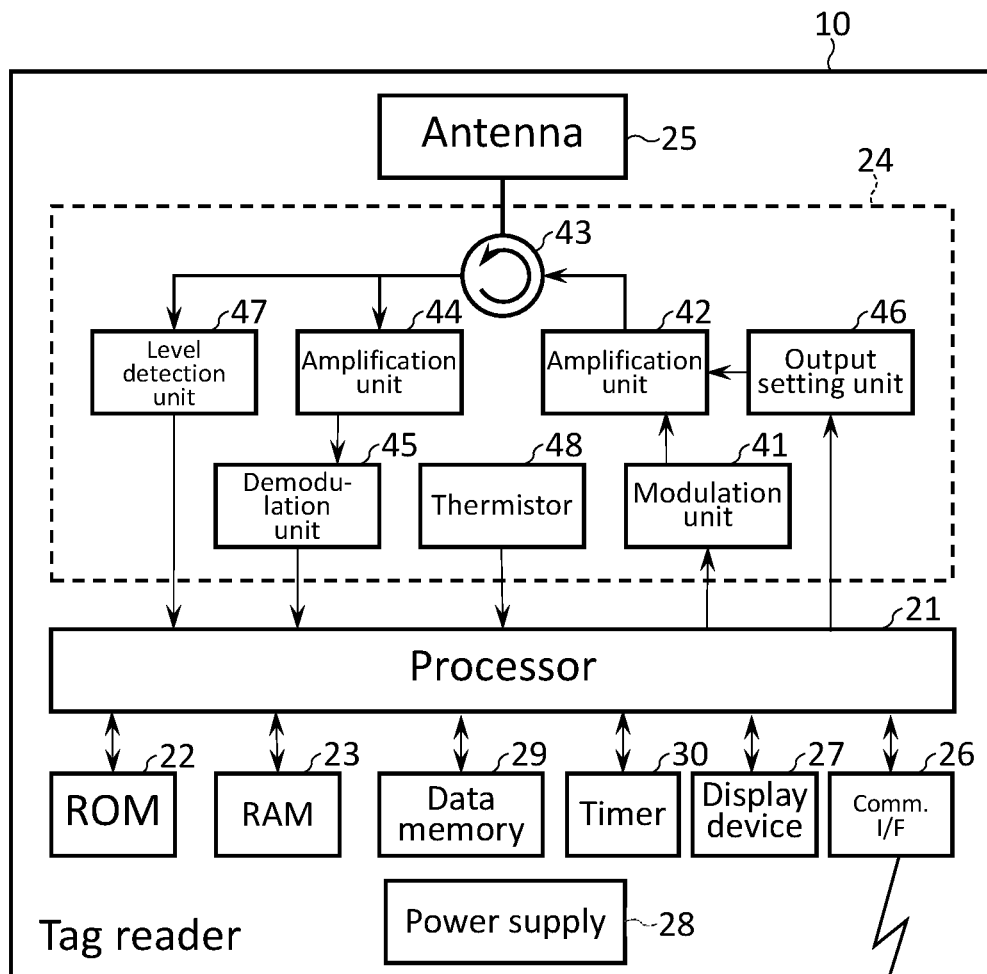
FIG. 1 is a block diagram of a tag reading system according to an embodiment.
Figure 1:
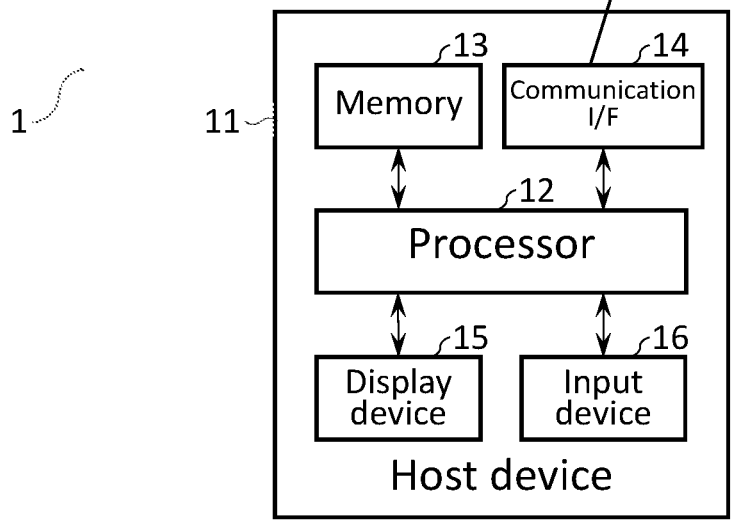

FIG. 1 is a block diagram illustrating an example configuration of a tag reading system 1 according to an embodiment. The tag reading system 1 according to the present embodiment includes a tag reader 10 and a host device 11. The tag reader 10 reads an RFID tag (or a wireless tag). The host device 11 estimates a position of an RFID tag based on a result of continuously reading the RFID tag by the tag reader 10 and identifies an article, an item, or the like to which the read RFID tag is attached.

For example, the tag reading system 1 is operated as a search system for searching for an article to which an RFID tag is attached in a predetermined area such as a warehouse or a store. In the tag reading system 1 as the search system, the tag reader 10 continuously reads the RFID tag while the tag reader 10 and the RFID tag move relative to each other. The host device 11 acquires a reading result of the RFID tag from the tag reader and detects a change in a relative position between the tag reader and the RFID tag based on the acquired reading result. The reading result of the RFID tag also includes information indicating an intensity of a reception signal received by the tag reader from the RFID tag. The host device 11 detects a change in the relative position between the tag reader and the RFID tag based on a change in the intensity of the received signal in time series.

In the present embodiment, the tag reader 10 continuously reads the RFID tag attached to an article such as a commodity while the tag reader 10 moves around. The host device 11 executes predetermined processing (such as search processing and article read processing) based on the reading result of the continuously read RFID tag. In another embodiment, in the tag reading system 1, the tag reader installed at a predetermined position may continuously read an RFID tag attached to a moving article.

The tag reader 10 reads information recorded in the RFID tag by receiving a response signal from the RFID tag present within a communication range by wireless communication. For example, the tag reader may be a handy type device that is held and operated by an operator or may be mounted on a moving body.

The tag reader 10 transmits a radio wave for requesting a response to the RFID tag at a preset intensity (or a preset output value). The tag reader 10 receives a response signal from the RFID tag to the radio wave requesting the response. The tag reader 10 receives a response signal indicating tag information from the RFID tag that is present in a communication range and has been activated by the transmitted radio wave. When multiple RFID tags are within the communication range, the tag reader receives response signals indicating tag information from the respective RFID tags.

The tag reader 10 measures a Received Signal Strength Indicator (RSSI) value indicating an intensity of a response signal (that is a reception signal) received from the RFID tag. The tag reader 10 may supply the tag information included in the response signal from the RFID tag together with the RSSI value to the host device 11 as a reading result of the RFID tag. Further, the tag reader 10 may also transmit an output value in a case where a response signal is received in response to a reading result of the RFID tag to the host device 11.

The RFID tag is attached to an article such as a commodity or a component, and tag information including information for identifying the article is recorded in an internal memory of the RFID tag. The RFID tag is activated by the radio wave transmitted from the tag reader 10. The RFID tag outputs a response signal including tag information recorded in its own memory in response to a read command from the tag reader 10. The RFID tag is operated by a radio wave output as an output signal from the tag reader 10. Therefore, the intensity of the response signal output by the RFID tag is also affected by the intensity or the output value of the radio wave transmitted from the tag reader 10.

The host device 11 is an information processing terminal having a communication function with the tag reader 10. For example, the host device 11 is an information processing terminal such as a smartphone or a tablet PC including a display device with a touch panel as a user interface. The host device may be an information processing device installed at a specific position as long as it has a communication interface capable of communicating with the tag reader.

In the present embodiment, the host device 11 includes a processor 12, a memory 13, a communication interface (I/F) 14, a display device 15, an input device 16, and the like. The processor 12 performs control of each unit, data processing, and the like. The processor 12 is, for example, a CPU. The processor 12 executes a program stored in the memory 13 to perform various operations. For example, the processor 12 detects the movement of the RFID tag or the change in the relative position between the tag reader 10 and the RFID tag based on the reading result of the RFID tag acquired from the tag reader 10. These processes are realized by the processor 12 executing a program (or programs), such as an application program, installed in the memory 13.

The communication I/F 14 is an interface for communicating with an external device. In the present embodiment, the communication I/F 14 is an interface for communicating with the tag reader 10. The communication I/F 14 may correspond to the communication function of the tag reader 10. The communication I/F 14 may be an interface for wired communication or an interface for wireless communication. For example, the communication I/F 14 is realized by a LAN interface, a universal serial bus (USE) interface, a Bluetooth (registered trademark) interface, a Wi-Fi interface, or the like.

The display device 15 is a device that displays information. For example, the display device 15 displays a detection result of the RFID tag (for example, movement of the RFID tag). The input device 16 is a device for an operator to input an operation instruction or the like. The display device 15 and the input device 16 are configured by, for example, a display device with a touch panel.

In the present embodiment, the tag reader 10 includes a processor 21, ROM 22, RAM 23, a communication controller such as a communication control circuit 24, an antenna 25, a communication interface (I/F) 26, a display device 27, a power supply 28, a data storage 29, and a timer 30.

The processor 21 controls each unit. The processor 21 includes, for example, an arithmetic circuit such as a CPU. The processor 21 implements control of each unit and various types of data processing by executing a program (or programs). The processor 21 may include an internal memory. The processor 21 implements various processes by executing a program stored in the ROM 22 or the internal memory. For example, the processor 21 interprets a command from the host device 11 received by the communication I/F 26 and executes a process corresponding to the command.

The ROM 22 is a non-volatile and non-rewritable memory. The ROM 22 stores a program (or programs) to be executed by the processor 21 and the like. The RAM 23 is a volatile memory that temporarily stores data. For example, the RAM 23 functions as a working memory or a buffer memory. The RAM 23 has a buffer memory for storing the reading result of the RFID tag.

The communication controller or the communication control circuit 24 and the antenna 25 constitute an RFID interface for reading an RFID tag. The communication control circuit 24 includes a control circuit for communicating with the RFID tag via the antenna 25. The communication control circuit 24 causes the antenna 25 to transmit a transmission signal (or a radio wave) supplied from the processor 21 at a preset output value. The antenna 25 outputs the transmission signal supplied from the communication control circuit 24 as a radio wave that can be received by the RFID tag.

The communication control circuit 24 not only outputs a transmission signal to the antenna 25 but also supplies a signal received by the antenna 25 to the processor 21 as reception data. For example, the antenna 25 receives a response signal from the RFID tag, and the response signal (reception signal) received by the antenna 25 is processed and supplied to the processor 21. For example, the communication control circuit 24 supplies, to the processor 21, tag information included in the reception signal from the RFID tag and an RSSI value indicating the intensity of the reception signal.

The communication I/F 26 is an interface for communicating with an external device. In the present embodiment, the communication I/F 26 is a communication interface for communicating with the host device 11. The communication I/F 26 may be an interface for wired communication or an interface for wireless communication. For example, the communication I/F 26 is realized by a LAN interface, a universal serial bus (USE) interface, a Bluetooth (registered trademark) interface, a Wi-Fi interface, or the like.

The display device 27 is a display device that displays an operation state of the RFID tag. The display device 27 is comprises, for example, an LED or the like. The power supply 28 supplies power for operating the tag reader 10. The power supply 28 supplies power for operation to each unit of the tag reader 10. For example, if the tag reader is a handy type, the power supply 28 may comprises a rechargeable battery. If the tag reader is a stationary type connectable to a commercial power supply, the power supply 28 may comprise a power supply circuit connected to the commercial power supply.

The data memory 29 is a rewritable and nonvolatile memory. The data memory 29 stores setting values and other information used for various processes. The setting values stored in the data memory 29 are, for example, information that can be updated according to an operation mode or the like. The data memory 29 may store an application program and the like. The data memory 29 may store information such as a processing result to be held even after the power is turned off.

The timer 30 measures time. The timer 30 measures an elapsed time under the control of the processor 21. For example, the timer 30 measures an elapsed time from when a read operation is stopped (for example, when output of the output signal is halted) to when the next read operation is started (for example, when output of the output signal is resumed). The processor 21 starts a read operation when an elapsed time measured by the timer 30 from when the read operation is stopped to when the next read operation is started reaches a preset read interval (that is a preset downtime of the reading operation).

In the present embodiment, the communication control circuit 24 includes a modulation unit (such as a modulation circuit) 41, a transmission-side amplification unit (such as a amplification circuit) 42, a direction coupler 43, a reception-side amplification unit (such as a amplification circuit) 44, a demodulation unit (such as a content circuit) 45, an output setting unit (such as an output level setting circuit) 46, a level detection unit (such as a reception level detection circuit) 47, and a thermistor 48.

The modulation unit 41 includes a modulation circuit that modulates a waveform signal (that is a carrier wave) with input data. That is, the modulation unit 41 modulates the carrier wave with data to be transmitted, which has been supplied from the processor 21. The transmission-side amplification unit 42 includes an amplification circuit that amplifies an input signal. The transmission-side amplification unit 42 amplifies the output signal of the modulation unit 41. The direction coupler 43 includes a circuit that supplies the output signal of the transmission-side amplification unit 42 to the antenna 25. Thus, the communication control circuit 24 outputs a carrier wave modulated by the transmission data from the antenna 25.

The RFID tag receives the radio wave transmitted from the antenna 25. The RFID tag recognizes, for example, a read command included in an interrogation signal received from the antenna 25. When the RFID tag recognizes the read command, the RFID tag outputs data, including tag information, stored in the memory of the RFID tag as a radio wave response signal. The response signal is generated, for example, by backscatter modulation.

The antenna 25 receives the radio wave output from the RFID tag. The direction coupler 43 includes a circuit that acquires the reception signal received by the antenna 25 and supplies the acquired reception signal to the reception-side amplification unit 44. The reception-side amplification unit 44 includes an amplification circuit that amplifies an input signal. The reception-side amplification unit 44 amplifies the reception signal received by the antenna 25. The demodulation unit 45 is a demodulation circuit that demodulates data superimposed on the waveform signal (or the carrier wave). The demodulation unit 45 demodulates data, such as tag information, included in the reception signal amplified by the reception-side amplification unit 44.

The antenna 25 may transmit and receive the radio wave to and from the RFID tag. The antenna 25 may transmit a signal to be supplied to the RFID tag and receive a radio wave output from the RFID tag. In the present embodiment, the antenna 25 is arranged to transmit an electromagnetic wave toward the reading area. The tag reader 10 is configured to communicate with a plurality of RFID tags attached to a plurality of commodities arranged in the reading area via the antenna 25. The antenna 25 is, for example, a planar antenna. The antenna 25 is not limited to a specific configuration.

The output setting unit 46 includes a setting circuit that sets the intensity (or the output value) of a signal to be output. The output setting unit 46 performs control so that the intensity of the signal output to the transmission-side amplification unit becomes a preset output value. The transmission-side amplification unit 42 amplifies the signal supplied from the modulation unit 41 so as to have an output value set by the output setting unit 46 and outputs the amplified signal to the coupler 43. Thus, the antenna 25 transmits the output signal (or the radio wave) having an output value set by the output setting unit 46 and supplied from the transmission-side amplification unit 42 via the direction coupler 43.

The level detection unit 47 is a level detection circuit that detects or measures an intensity of a signal. The level detection unit 47 detects an intensity of a signal input to the reception-side amplification unit 44. A reception signal received by the antenna 25 is input to the reception-side amplification unit 44 via the direction coupler 43. For example, the level detection unit 47 is configured to detect an RSSI value indicating the intensity of a reception signal (that is a response signal from the RFID tag) received by the antenna 25.

The thermistor 48 is a sensor that measures or detects temperature. The thermistor 48 measures a temperature inside a body (outer casing) of the tag reader 10. For example, the thermistor 48 detects a temperature of a substrate on which the communication control circuit 24 is formed, which is disposed in the tag reader body. The thermistor 48 provides information indicative of the detected temperature to the processor 21. The processor 21 executes operation control such as communication control according to the temperature detected by the thermistor 48.

Figure 2:
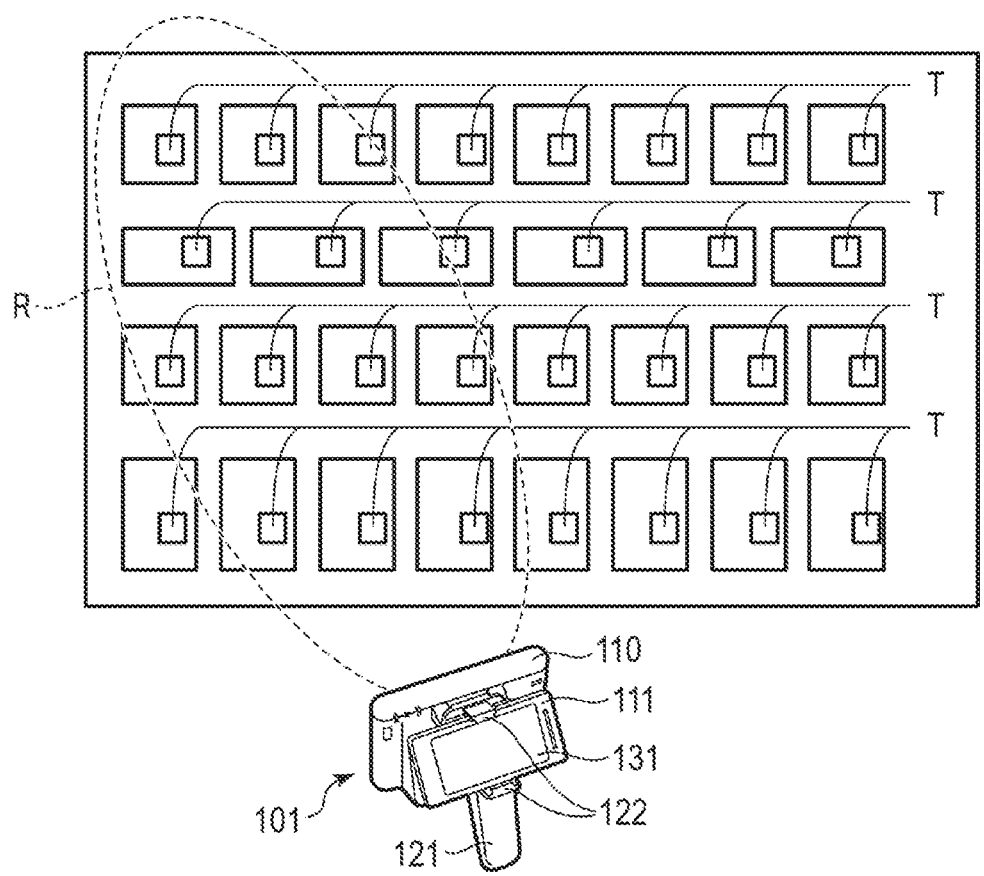
FIG. 2 depicts an RFID tag search system according to an embodiment.

According to the present embodiment, the tag reading system 1 may operate in multiple operation modes such as an RFID tag search mode and an article reading mode. FIG. 2 depicts an example configuration of an RFID tag search system 101, that is the tag reading system 1 operating in the RFID tag search mode. The search system 101 as the tag reading system 1 is a system for searching for a specific RFID tag (such as a RFID tag attached to a specific commodity) T in a search area S. For example, when searching for a specific commodity in a warehouse or a store, the search system 101 estimates a position of an RFID tag attached to a commodity based on a reading result of an RFID tag T by the tag reader 110. The search system 101 notifies an operator by displaying the estimated position of the RFID tag T. Thus, the search system 101 can assist the operator in searching for the specific commodity.

The search system 101 as the tag reading system 1 shown in FIG. 2 includes a handy type tag reader 110 and a host device 111 communicably connected to the tag reader 110. In the example configuration shown in FIG. 2, the tag reader 110 is a modification of the tag reader 10 shown in FIG. 1, and the host device 111 is a modification of the host device 11 shown in FIG. 1.

The tag reader 110 shown in FIG. 2 includes, in addition to the configuration of the control system shown in FIG. 1, a gripping part 121 to be gripped by an operator, a holding part 122 for holding the host device 111 to the tag reader 110, and the like. In the tag reader 110, an operator grips and operates the gripping part 121 in a state where the host device 111 is being held by the holding part 122. For example, until a desired RFID tag T is detected, the operator moves the tag reader 110 to search the search area by changing a communication range (that is a read range of an RFID tag) R.

The host device 111 has the same or substantially the same configuration as that of the control system shown in FIG. 1 and includes a display device with a touch panel as the display device 15 and the input device 16. For example, the host device 111 may be implemented by a portable information terminal such as a smartphone or a tablet PC. The host device 111 notifies the operator of the position of the desired RFID tag T estimated based on the reading result of the RFID tag by the tag reader 110.

The search system 101 searches for the RFID tag T while the operator grips the tag reader 110 at the gripping part 121 and moves the tag reader 110 in a state where the host device 111 is being communicably connected to the tag reader 110 while being held by the holding part 122 of the tag reader 110. In the search system 101, the tag reader 110 reads an RFID tag at a predetermined reading interval in the communication range R that changes according to the movement by the operator. The tag reader 110 supplies the reading result of the RFID tag in the communication range that changes according to the operation of the operator to the host device 111. The tag reader 110 supplies tag information (or tag ID) such as an Electronic Product Code (EPC), an RSSI value of the received signal, and an output value at the time of a read operation to the host device 111 as the reading result of each RFID tag.

The host device 111 detects a particular (targeted) RFID tag T in the reading results of all the RFID tags T supplied from the tag reader 110. The host device 111 estimates the position of the particular RFID tag T based on the reading result for the particular RFID tag T. In this context, the host device 111 detects either a change in the position of particular (target) RFID tag T or the change in the relative positions of the tag reader 110 and the particular RFID tag based on the RSSI value or the like included in the reading result for the particular RFID tag. The intensity of the signal (e.g., the RSSI value) received by the tag reader 110 from each of the RFID tags T varies with the intensity (output value) of the radio wave (interrogation signal) being output by the tag reader 110. Therefore, the host device 111 also acquires the output value that was used by the tag reader 110 when reading the RFID tag T and estimates the position of an RFID tag T by the change of the RSSI value accounting for any change in the output value of the interrogation signal being used to generate a particular response from the RFID tag T. The host device 111 can display information indicating the position or the like of a RFID tag T that has been estimated based on the reading result(s) from the RFID tag T on a display device 131 with a touch panel.

Figure 3:
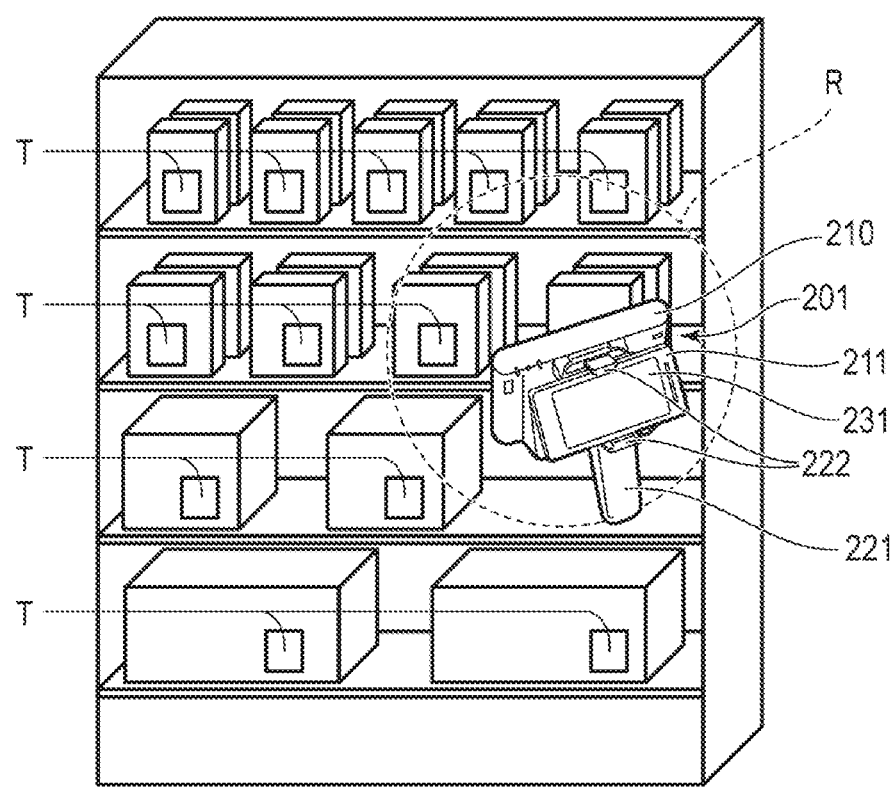
FIG. 3 depicts an article reading system according to an embodiment.

FIG. 3 depicts an example configuration of an article reading system (or an inventory system) 201, that is the tag reading system 1 operating in the article reading mode. The article reading system 201 as the tag reading system 1 is a system that reads an RFID tag T attached to an article, such as a commodity, placed at a predetermined position such as a shelf. For example, the article reading system 201 is a system for identifying a commodity present at a predetermined position by reading an RFID tag T attached to each commodity present at a predetermined position such as a shelf. For example, in an inventory operation, an operator can specify a commodity present on a shelf by causing a tag reader 210 to read an RFID tag T attached to each commodity on the shelf.

The article reading system 201 as the tag reading system 1 shown in FIG. 3 includes a handy type tag reader 210 and a host device 211 communicably connected to the tag reader 210. In the example configuration shown in FIG. 3, the tag reader 210 is a modification of the tag reader 10 shown in FIG. 1, and the host device 211 is a modification of the host device 11 shown in FIG. 1.

The tag reader 210 and the host device 211 may have the same or substantially the same configuration as that of the tag reader 110 and the host device 111 illustrated in FIG. 2. For example, in addition to the configuration of the control system illustrated in FIG. 1, the tag reader 210 includes a gripping part 221 to be gripped by an operator, a holding part 122 for holding the host device 211 to the tag reader 210, and the like. The host device 111 has the same or substantially the same configuration as that of the control system shown in FIG. 1 and includes a display device with a touch panel as the display device 15 and the input device 16. For example, the host device 111 may be implemented by a portable information terminal such as a smartphone or a tablet PC.

In the article reading system 201, the tag reader 210 in a state where the host device 211 is being communicably connected to the tag reader 210 while being held by the holding part 222 is operated by an operator who grips the gripping part 221. For example, an operator moves the tag reader 210 so that the entire shelf can be read by moving the communication range (that is the read range of the RFID tag) R of the tag reader 210.

In the article reading system 201, the tag reader 210 reads the RFID tag T in the communication range R changed by movement by an operator at a predetermined reading interval. The tag reader 210 supplies a reading result of the RFID tag in the communication range R that changes according to the operation of the operator to the host device 211. The tag reader 210 supplies tag information (or tag ID) such as an EPC and an output value at the time of the read operation to the host device 211 as the reading result of each RFID tag T.

The host device 211 identifies an article to which the read RFID tag T is attached based on the reading result of each RFID tag T acquired from the tag reader 210. The host device 211 identifies the article to which the RFID tag T is attached based on the read tag information of the RFID tag T. The host device 211 may identify information indicating which commodity and how many commodities exist based on a serial number unique to each RFID tag T included in the tag information. The host device 211 may display information indicating the article identified based on the reading result of the RFID tag T on a display device 231 with a touch panel. In addition, the host device 211 may supply information indicating the article identified based on the reading result of each RFID tag T to a higher-level host device (for example, a management server).

The search system 101 as the tag reading system 1 in the first operation mode and the article reading system 201 as the tag reading system 1 in the second operation mode may be realized by the same hardware configuration. The search system 101 and the article reading system 201 may be realized by switching modes using the same hardware configuration. For example, the host device 11 (111, 211) may operate the tag reader 10 (110, 210) in a mode designated by an operator.

Referring back to FIG. 1, the data memory 29 of the tag reader 10 stores setting information, such as setting values and the like, for the operation of the tag reader 10. FIG. 4 depicts example setting tables (herein may also be referred to as first and second setting tables, respectively) 51 and 52 indicating setting values such as stepwise setting values, that the tag reader 10 sets for a read operation according to a temperature, such as an internal temperature, of the tag reader 10, according to the present embodiment. The first setting table 51 corresponding to a first operation mode and a second setting table 52 corresponding to a second operation mode are stored in the data memory 29 in the present embodiment. The setting tables 51 and 52 stored in the data memory 29 may be updated. A new setting table corresponding to a new operating condition (for example, a new operating mode) may be added to the data memory 29.

The first setting table 51 and the second setting table 52 shown in FIG. 4 have the same table configuration but different setting values. In another instance, the setting tables stored in the data memory 29 may each have different table configurations. In the setting tables 51 and 52, an output value P and a downtime D are set for different temperature ranges defined by different thresholds for the temperature a. Here, temperature a is, for example, an internal temperature of the tag reader 10. In the present embodiment, the temperature a is a temperature measured by the thermistor 48 (FIG. 1). The output value P indicates a setting value for the magnitude of the output signal (radio wave) output from the antenna 25 (FIG. 1). That is, the output level P is the power level setting used in generating an output signal of the tag reader 10. The downtime D is a setting value for an interval (a reading interval) between individual read operations of the tag reader 10 when read operations are being continuously executed in series. That is, the downtime D is the set length of time between RFID tag reading cycles in a continuous reading mode of the tag reader 10.

The first setting table 51 indicates setting values for the output value P and the downtime D in the first operation mode. In the first setting table 51, the output value P and the downtime D are set with respect to three threshold values $th11$, $th12$, and $th13$ for the temperature a. In the present embodiment, the three thresholds $th11$, $th12$, and $th13$ satisfy a relationship of the first threshold $th11$< the second threshold $th12$< the third threshold $th13$.

In this example, when the temperature a is equal to or lower than the first threshold $th11$, the output value P is set to an initial value $p10$, and the downtime D is set to an initial value $d10$. When the temperature a is equal to or lower than the first threshold $th11$, the temperature in the tag reader 10 is assumed to be a normal value (that is a temperature at which control for suppressing the temperature is unnecessary), and the initial setting values are used for the output value P and the downtime D.

When the temperature a is higher than the first threshold $th11$ and equal to or lower than the second threshold $th12$, the output value P is set to a value obtained by subtracting a first output adjustment value $p11$ from the initial value $p10$. In this case, the downtime D is set to a value obtained by adding a first adjustment value $d11$ to the initial value $d10$. When the temperature a is higher than the first threshold $th12$ and equal to or lower than the third threshold $th13$, the output value P is set to a value obtained by subtracting the first output adjustment value $p11$ and a second output adjustment value $p12$ from the initial value $p10$. In this case, the downtime D is set to a value obtained by adding the first adjustment value $d11$ and a second time adjustment value $d12$ to the initial value $d10$. Further, when the temperature a is higher than the third threshold $th13$, the read operation of the RFID tag becomes an error. For example, when the temperature a is higher than the third threshold value $th13$, the temperature in the tag reader 10 is determined to be an abnormal value that disables the operation, and the read operation of the RFID tag is stopped or prohibited.

The second setting table 52 shows the setting values of the output value P and the downtime D in the second operation mode different from the first operation mode. In the second setting table 52, the output value P and the downtime D are set corresponding to three threshold values $th21$, $th22$, and $th23$ for the temperature a. In the present embodiment, the three thresholds $th21$, $th22$, and $th23$ satisfy a relationship of the first threshold $th21$< the second threshold $th22$< the third threshold $th23$. The three thresholds $th21$, $th22$, and $th23$ may be the same as or different from the thresholds $th11$, $th12$, and $th13$.

For example, when the temperature a is equal to or lower than the first threshold $th21$, the output value P is set to an initial value $p20$, and the downtime D is set to an initial value $d20$. When the temperature a is equal to or lower than $th21$, the temperature in the tag reader 10 is assumed to be a normal value (that is, a temperature at which control for suppressing the temperature is unnecessary), and the initial setting values are used for the output value P and the downtime D. When the temperature a is higher than the first threshold $th21$ and equal to or lower than the second threshold $th22$, the output value P is set to a value obtained by subtracting a first output adjustment value $p21$ from the initial value $p20$. In this case, the downtime D is set to a value obtained by adding a first adjustment value $d21$ to the initial value $d20$.

When the temperature a is higher than the second threshold $th22$ and equal to or lower than the third threshold $th23$, the output value P is set to a value obtained by subtracting the first output adjustment value $p21$ and a second output adjustment value $p22$ from the initial value $p20$. In this case, the downtime D is set to a value obtained by adding the first adjustment value $d21$ and a second time adjustment value $d22$ to the initial value $d20$. Further, when the temperature a is higher than the third threshold $th23$, the read operation of the RFID tag becomes an error. For example, when the temperature a is higher than the third threshold value $th23$, the temperature in the tag reader is determined to be an abnormal value that disables the operation, and the read operation of the RFID tag is stopped or prohibited.

The output adjustment values $p21$ and $p22$ of the second setting table 52 may be the same as or different from the output adjustment values $p11$ and $p12$ of the first setting table 51. The time adjustment values $d21$ and $d22$ in the second setting table 52 may be the same as or different from the time adjustment values $d11$ and $d12$ in the first setting table 51. Any of the output adjustment values $p11$, $p12$, $p21$, and $p22$ or the time adjustment values $d11$, $d12$, $d21$, and $d22$ may be "0" in one instance.

As shown in FIG. 4, a setting table can be provided for each operation mode. For example, in a mode in which keeping the reading interval as short as possible is prioritized, the setting table values can be set such that lowering of the output value P is prioritized with respect to a temperature rise and increasing the downtime D can be suppressed. As another example, in a mode in which priority is placed on keeping the output value (which relates to the tag reading communication range) as high as possible, the setting table values can be set such that decreases in the output value P with temperature rise is limited in favor of increasing the length of downtime D.

As a further example, in the search system 101 (FIG. 2), the position of the RFID tags is unknown. Therefore, when the tag reader 10 is being operated in an RFID tag search mode corresponding to the search system 101, for example, the downtime D can be made longer instead making reductions in the output value so that the communication range of the tag reader is kept as wide as possible. This provides an operation setting capable of searching for an RFID tag attached to an article while maintaining a wide search range.

As a still further example, in the article reading system 201 (FIG. 3), although the reading target area (for example, a shelf) is predetermined or known in advance, it is still required to reliably read the RFID tags in the reading target area. For this reason, in a case where the operation mode is corresponds to that of the article reading system 201, for example, the setting table values can be set such that the output value P decreases with the temperature rise relatively more than the downtime D is increased with the temperature rise. This keeps the reading interval as short as possible. This achieves an operation setting in which an RFID tag attached to an article in a reading target area, such as a shelf, can be reliably read even when an operator quickly moves the tag reader 210 over the reading target area.

Figure 5:
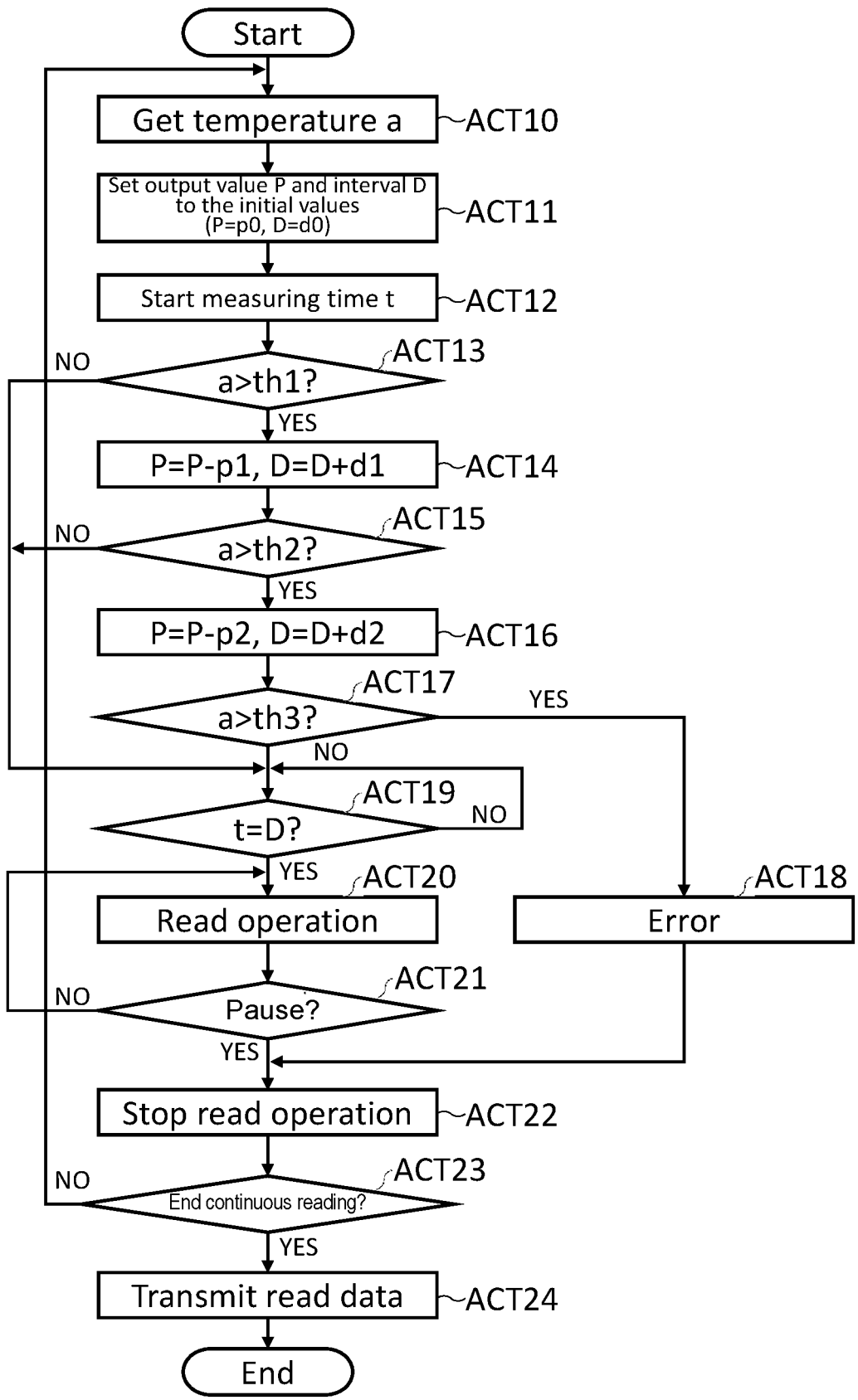
FIG. 5 is a flowchart of an example operation of a tag reader according to an embodiment.

FIG. 5 is a flowchart of an example operation of the tag reader 10 according to the present embodiment. The processor 21 of the tag reader 10 starts continuous reading processing, such as search processing or article reading processing, in response to a request from the host device 11 communicably connected through the communication I/F 26. When reading of the RFID tag is started, the processor 21 acquires the temperature a of the tag reader 10 detected by the thermistor 48 (ACT10). When the RFID tag reading is started, the processor 21 starts measuring an elapsed time t by using the timer 30 (ACT12).

When the RFID tag reading is started, the processor 21 sets the output value P and the reading interval (downtime) D to initial values (ACT11). The initial values for the output value P and the reading interval D are stored in a register provided in the RAM 23 or the data memory 29. For example, the processor 21 sets the output value P stored in the register to the standard value p0 (e.g., p10 in the first setting table 51 or p20 in the second setting table 52) and sets the reading interval D to the standard value d0 (e.g., d10 in the first setting table 51 or d20 in the second setting table 52). Thus, in ACT11, P=p0 (where p0=p10 or p20, for example) and D=d0 (where d0=d10 or d20, for example).

After acquiring the temperature a of the tag reader 10, the processor 21 utilizes the setting table corresponding to the appropriate operation mode for updating the output value P and the reading interval D in response to temperature changes. Once the setting table for the selected operation mode has been identified, the processor 21 compares the temperature a with the first threshold th1 (e.g., th11 in the first setting table 51 or th21 in the second setting table 52) of the selected setting table (ACT13). If the temperature a is equal to or lower than the first threshold th1 (th11, th21) in the selected setting table (ACT13, NO), the output value P is kept at the standard value p0 and the reading interval D is kept at the standard value d0, and the process proceeds to ACT19.

When the temperature a is greater than the first threshold th1 for the selected setting table (ACT13, YES), the processor 21 updates the output value P and the reading interval D in accordance with the selected setting table values (ACT14). In this example, the processor 21 subtracts the output adjustment value p1 (e.g., p11 in the first setting table 51 or p21 in the second setting table 52 depending on operation mode) from the presently set output value P (stored in the register) to obtain a new output value P=p0−p1. The processor 21 adds the time adjustment value d1 (e.g., d11 in the first setting table 51 or d21 in the second setting table 52 depending on operation mode) to the presently set reading interval D (stored in the register) to obtain a new interval D=d0+d1.

After comparing the temperature a with the first threshold th1 (th11, th21) in the selected setting table, the processor 21 compares the temperature a with the second threshold th2 (e.g., th12 in the first setting table 51 or th22 in the second setting table 52 depending on operation mode) for the selected setting table (ACT15). When the temperature a is equal to or lower than the second threshold th2 in the selected setting table (ACT15, NO), the processor 21 updates the output value P and the reading interval D stored in the register and proceeds to ACT19. In this example, when th1<a≤th2, the output value is set to be P=p0−p1, and the reading interval D is set to be D=d0+d1.

However, when the temperature a is higher than the second threshold th2 (th12, th22) in the selected setting table (ACT15, YES), the processor 21 updates the output value P and the reading interval D in accordance with the selected setting table (ACT16). In this example, when a>th2, the processor 21 subtracts the output adjustment value p2 (for example, p12 in the first setting table 51 or p22 in the second setting table 52) from the output value P stored in the register to obtain an updated output value P=p0−p1−p2. When a>th2, the processor 21 adds the time adjustment value d2 (d12, d22) to the reading interval D stored in the register to obtain an updated interval D=d0+d1+d2.

After comparing the temperature a with the second threshold th2 (th12, th22) for the selected setting table, the processor 21 compares the temperature a with the third threshold th3 (e.g., th13 in the first setting table 51 or th23 in the second setting table 52) in the selected setting table (ACT17). When the temperature a is less than or equal to the second threshold th3 in the selected setting table (ACT17, NO), the processor 21 utilizes the output value P and the reading interval D already stored in the register and proceeds to ACT19. In this example, when th2<a≤th3, the output value P equals p0−p1−p2 (P=p0−p1−p2), and the reading interval D equals d0+d1+d2 (D=d0+d1+d2).

However, when the temperature a is higher than the third threshold th3 (ACT17, YES), the processor 21 executes error processing according to the selected setting table (ACT18). For example, when a>th3, the processor 21 stops the read operation and executes error processing. As the error processing, the processor 21 displays an error on the display device 27, for example. In addition, the processor 21 may notify the host device 11 that the read operation has been to be stopped due to an increase in the temperature of the tag reader 10. When the temperature a is higher than the third threshold th3 (ACT17, YES), the processor 21 proceeds from ACT18 to ACT22 and waits for the temperature to decrease. In other examples, when the temperature a is higher than the third threshold th3, the processor 21 may automatically stop the continuous reading process and forcibly end the series of processes.

Once the output value P and the reading interval D have been determined, the processor 21 determines whether the elapsed time t has reached the reading interval D (ACT19). When the elapsed time t reaches the reading interval D (ACT19, YES), the processor 21 executes a read operation (ACT20) for reading an RFID tag by transmitting an output signal with an output value P that has been set according to the temperature of the tag reader 10.

As part of the read operation, the processor 21 designates the output value P to the output setting unit 46 of the communication control circuit 24 and sets the output signal to be output from the antenna 25 at the designated output value P. After setting the output value, the processor 21 causes the communication control circuit 24 to transmit the output signal including a read command (a tag interrogation signal) at the set output value from the antenna 25. For example, the communication control circuit 24 generates a modulation signal by modulating a carrier wave with the read command using the modulation unit 41. The transmission-side amplification unit 42 amplifies the modulated signal from the modulation unit 41 to the output value set by the output setting unit 46. The modulated signal amplified to the set output value by the transmission-side amplification unit 42 is supplied to the antenna 25 via the direction coupler 43. The antenna 25 then transmits the output signal including the read command as a radio wave.

Any RFID tag in the reading area (communication range) of the output signal from the antenna 25 is activated by receiving the output signal and recognizes the read command included in the output signal. Any RFID tag that has recognized the read command transmits a response signal including tag information stored in its memory by, for example, backscatter modulation.

The antenna 25 of the tag reader 10 receives the response signal(s) from the RFID tag(s). The signal received by the antenna 25 is supplied to the reception-side amplification unit 44 via the direction coupler 43. The reception signal amplified by the reception-side amplification unit 44 is input to the demodulation unit 45 and demodulated into a signal indicating the tag information of the RFID tag(s). The signal demodulated by the demodulation unit 45 is supplied to the processor 21 as tag information (ID) as read from the RFID tag(s) within the reading area.

The response signal input to the reception-side amplification unit 44 is also input to the level detection unit 47. The level detection unit 47 measures the strength of the received response signal and supplies an RSSI value indicating the measured strength of the response signal to the processor 21. Thus, the processor 21 acquires tag information (ID) from the demodulation unit 45 and the RSSI value as for each response signal received from a RFID tag in the reading area.

The processor 21 stores the acquired reading results (tag information and the RSSI value) in a buffer memory provided in the RAM 23 in association with the output value used for obtaining the reading results. Thus, every time a RFID tag is read, the reading result from the RFID tag can include the tag information (ID), the RSSI value, and the output value associated with each other in the buffer memory as a reading record or the like.

While executing the read operation, the processor 21 determines whether to pause the continuous read operations (ACT21). When it is determined that the read operation is to be paused (ACT21, YES), the processor 21 temporarily stops (pauses) the read operation (ACT22) and then next determines whether to completely end the continuous reading operations (ACT 23). For example, the processor 21 determines to end the continuous reading operations if the processor 21 has received a command requesting a process end from the host device 11.

In a case where the continuous reading process is not ended, that is, in a case where another read operation will be performed (ACT23, NO) after the pause in the continuous read operations, the processor 21 returns to ACT10 and performs the processes again. Accordingly, the processor 21 repeatedly executes a read operation for reading RFID tags until the processor 21 determines that the continuous reading process is to be ended. When the continuous reading process is ended (ACT23, YES), the processor 21 transmits the reading results for the RFID tag(s) stored in the buffer memory (provided in RAM 23) to the host device 11 (ACT24). The processor 21 transmits the reading results including tag information of the RFID tags, the RSSI values, and the output values to the host device 11. In another instance, the specific information to be transmitted to the host device may be determined according to the operation mode. For example, the tag information associated to an output value may be transmitted to the host device 11 or only the tag information may be transmitted.

The host device 11 acquires the reading result of the RFID tag at the reading interval D set according to the measured temperature as a time-series RFID tag reading result by the communication I/F 14. The processor 12 of the host device 11 executes processing such as estimation of a position of a specific RFID tag or identification of an article to which the RFID tag is attached based on the acquired reading result of the RFID tag. For example, the host device 11 may estimate the position of the RFID tag from the communication range (read range) based on the output value included in the reading result of the RFID tag.

According to the present embodiment, the tag reader 10 sets the output value P of the signal to be output from the antenna 25 according to the measured temperature, such as the internal temperature, of the reader device itself. The tag reader 10 adjusts the reading interval D of the RFID tag according to the measured temperature. This way, the tag reader can limit a temperature rise inside the body of the tag reader 10 and can prevent its components from being damaged by a high temperature.

The tag reader 10 according to the present embodiment stores setting information such as setting values associated with one or more operation modes and sets the output value P and the reading interval D according to the measured temperature based on the setting information corresponding to the one or more operation modes. Thus, the tag reader 10 can set the control for suppressing a temperature rise according to the selected operation mode of the tag reading system 1 and can suppress a temperature rise so as to acquire the reading result suitable for the selected operation mode.

In the present embodiment, the program (or programs) executed by the processor 21 is stored in advance in the memory such as the data memory 29 in the tag reader 10. In another embodiment, the program to be executed by the processor 21 may be downloaded to the tag reader 10 from a network or may be installed in the tag reader 10 from a storage medium. The storage medium may be any storage medium that can store the program and that can be read by the tag reader 10. The functions obtained by the installation or download in advance may be realized in cooperation with an operating system (OS) or the like in the tag reader 10.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tag reader, comprising:
   a communication controller configured to control output signals to be output from an antenna in a tag reading operation;
   a temperature measuring sensor configured to measure an internal temperature of the tag reader;
   a memory storing a plurality of setting values for the output signals, the setting values corresponding to a plurality of temperature ranges; and
   a processor configured to:
      search the memory for a setting value corresponding to the measured internal temperature, and
      cause the communication control circuit to output an output signal from the antenna at the setting value.

2. The tag reader according to claim 1, wherein the processor is further configured to set an interval between the output of output signals from the antenna in the tag reading operation based on the measured internal temperature.

3. The tag reader according to claim 2, wherein
   the memory further stores a plurality of intervals for the output signals corresponding to the temperature ranges being defined by a plurality of predetermined thresholds, and the processor is further configured to search the memory for an interval corresponding to the measured internal temperature.

4. The tag reader according to claim 1, wherein the plurality of setting values stored in the memory includes a plurality of stepwise setting values, and the temperature ranges are defined by a plurality of predetermined thresholds.

5. The tag reader according to claim 4, wherein the data memory stores the setting values for a plurality of operation modes.

6. The tag reader according to claim 1, wherein the temperature measuring sensor is a thermistor.

7. The tag reader according to claim 1, further comprising: a grip portion configured to be held by a user.

8. The tag reader according to claim 1, wherein the processor is configured to vary the setting value for consecutive tag reading operations based on the measured temperature.

9. The tag reader according to claim 1, further comprising:
a communication interface configured to communicate with a host device, wherein
the processor is configured to cause the communication interface to transmit tag information obtained from a response signal from an RFID tag, a signal strength of the response signal from the RFID tag, and a setting value of an output signal corresponding to the response signal from the RFID tag.

10. An RFID tag reader, comprising:
a temperature sensor configured to measure an internal temperature of the RFID tag reader; and
a processor configured to:
select a first operation mode from among a plurality of operation modes corresponding to a plurality of parameter setting tables, each parameter setting table including a different interrogation signal output value setting and a reading interval setting for different temperature ranges;
select a first setting table from among the plurality of parameter setting tables for the first operation mode;
select an interrogation signal output value setting and a reading interval setting from the first setting table based on a comparison of the measured internal temperature to the different temperature ranges of the first setting table; and
transmit interrogation signals from an antenna at an output value set according to the selected interrogation signal output value setting and with a reading interval set according to the selected reading interval setting.

11. The RFID tag reader according to claim 10, further comprising:
a communication controller configured to control the output value of interrogation signals output from the antenna based on the selected interrogation signal output value setting.

12. The RFID tag reader according to claim 10, wherein the interrogation signal output value setting of the first setting table decreases with increased temperature.

13. The RFID tag reader according to claim 10, wherein the reading interval setting of the first setting table increases with increased temperature.

14. A wireless tag reader, comprising:
an antenna;
a communication controller connected to the antenna and configured to control output signals to be output from the antenna in a tag reading operation;
a temperature measuring sensor configured to measure an internal temperature of the tag reader;
a memory storing a plurality of setting values for the output signals, the setting values corresponding to a plurality of temperature ranges; and
a processor connected to the communication controller and configured to:
search the memory for a setting value corresponding to the measured internal temperature, and
provide the setting value to the communication control circuit and cause the communication control circuit to output the tag interrogation signal from the antenna at the setting value.

15. The wireless tag reader according to claim 14, wherein the processor is further configured to set an interval between the output of tag interrogation signals from the antenna in the tag reading operation based on the measured internal temperature.

16. The wireless tag reader according to claim 15, wherein
the memory further stores a plurality of intervals for the output signals corresponding to the temperature ranges being defined by a plurality of predetermined thresholds, and
the processor is further configured to search the memory for an interval corresponding to the measured internal temperature.

17. The wireless tag reader according to claim 14, wherein
the plurality of setting values stored in the memory includes a plurality of stepwise setting values, and the temperature ranges are defined by a plurality of predetermined thresholds.

18. The wireless tag reader according to claim 14, wherein the temperature measuring sensor is a thermistor.

19. The wireless tag reader according to claim 14, further comprising:
a grip portion configured to be held by a user.

20. The wireless tag reader according to claim 14, wherein the processor is configured to vary the setting value for consecutive tag reading operations based on the measured temperature.

* * * * *